Dec. 5, 1961 M. BUD ET AL 3,011,857

TIME RECORDING DEVICES

Filed Dec. 12, 1957 6 Sheets-Sheet 1

Inventors
MARTIN BUD
LEONARD J. PENFOLD
By [signature] Agt.

Dec. 5, 1961 M. BUD ET AL 3,011,857

TIME RECORDING DEVICES

Filed Dec. 12, 1957 6 Sheets-Sheet 2

Inventors
MARTIN BUD
LEONARD J. PENFOLD
By [signature] Att.

Dec. 5, 1961 M. BUD ET AL 3,011,857

TIME RECORDING DEVICES

Filed Dec. 12, 1957 6 Sheets-Sheet 3

Inventor
MARTIN BUD
LEONARD J. PENFOLD
By [signature]
AGT.

Inventors:
MARTIN BUD
LEONARD J. PENFOLD
By [signature] Att.

Inventors:
MARTIN BUD
LEONARD J. PENFOLD
By [signature]
Att'y

Dec. 5, 1961 M. BUD ET AL 3,011,857

TIME RECORDING DEVICES

Filed Dec. 12, 1957 6 Sheets-Sheet 6

Inventors:
MARTIN BUD
LEONARD J. PENFOLD
By 3,011,857

TIME RECORDING DEVICES

Martin Bud, 80 Hampstead Way, London, N.W. 11, England, and Leonard J. Penfold, Pinner, England; said Penfold assignor to said Martin Bud Filed Dec. 12, 1957, Ser. No. 702,357
Claims priority, application Great Britain Dec. 19, 1956
4 Claims. (Cl. 346—141)

The invention relates to time recording devices for registering time on record cards to indicate the commencing and finishing times of workpeople's attendances, jobs, and the like.

In known such devices, a record card is inserted into the device, and the time of insertion, sometimes combined with the relevant date, is imprinted on the card in fields suitably provided thereon, the time being usually indicated in hours and minutes, or in hours and decimal fractions of hours. The imprints on the cards have to be evaluated by a clerk. Experience has shown that the evaluation of the imprinted cards is tedious, and that mistakes are liable to occur, for example, by confusing a time of commencing a job with that of finishing the job or by overlooking the dates when a job extends over more than one day.

It is an object of the invention to provide an improved time recording device which records times by punching holes on record cards at predetermined places which are indicative of the times and dates to be recorded. Punched record cards so obtained lend themselves easily for automatic evaluation of the records, whereby the danger of mistakes is avoided or at least reduced.

It is another object of the invention to provide a device for recording times by punching holes into a record sheet and simultaneously indicating another quality by the shape of the punched hole and/or its exact position on the record sheet.

A further object of the invention is to provide a time recording device having two punch means which when operated alternatively punch one of at least two possible hole configuration relatively to the record sheet whereby to indicate at least one quality additional to indicating the time of punching. Thus, for example, the different hole configurations may be different shapes of holes or different positions of the holes, such different positions of the holes being however indicative of the same time. For example, one hole configuration may indicate the beginning of a work shift and the other the end of the shift.

It is still another object of the invention to provide a time recording device having a single punch which is displaceable and rotatable relatively to the record sheet for indicating the efflux of time in units and sub-units and for indicating at least one additional quality.

Still a further object is the provision of a record card for use in the time recording device of the invention.

These and other objects and advantages of the invention will become apparent to those skilled in the art from the following description when read in conjunction with the accompanying drawings which show, by way of example, three embodiments of the invention and in which.

Figure 5:
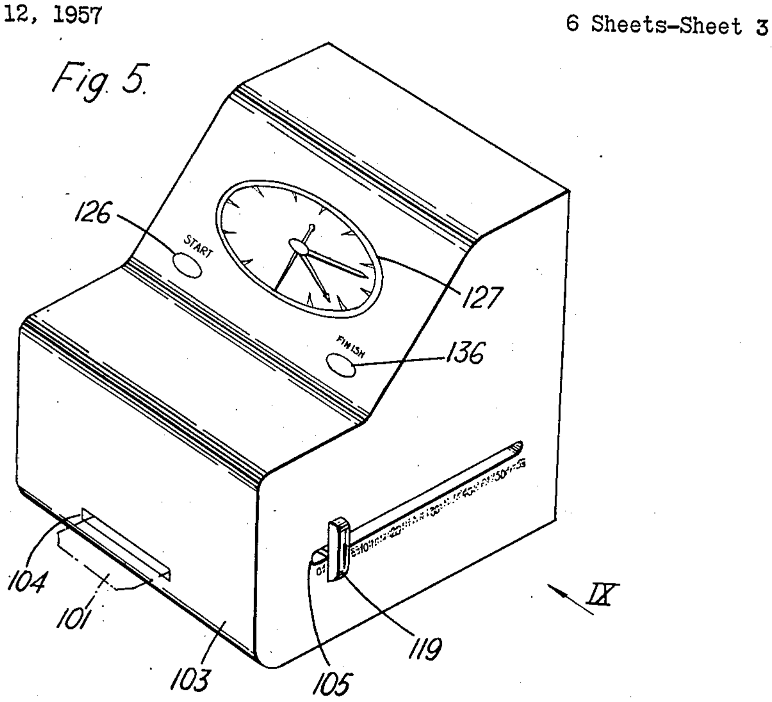
FIG. 5 is a perspective view of a second recording clock.
Figures 12, 13:
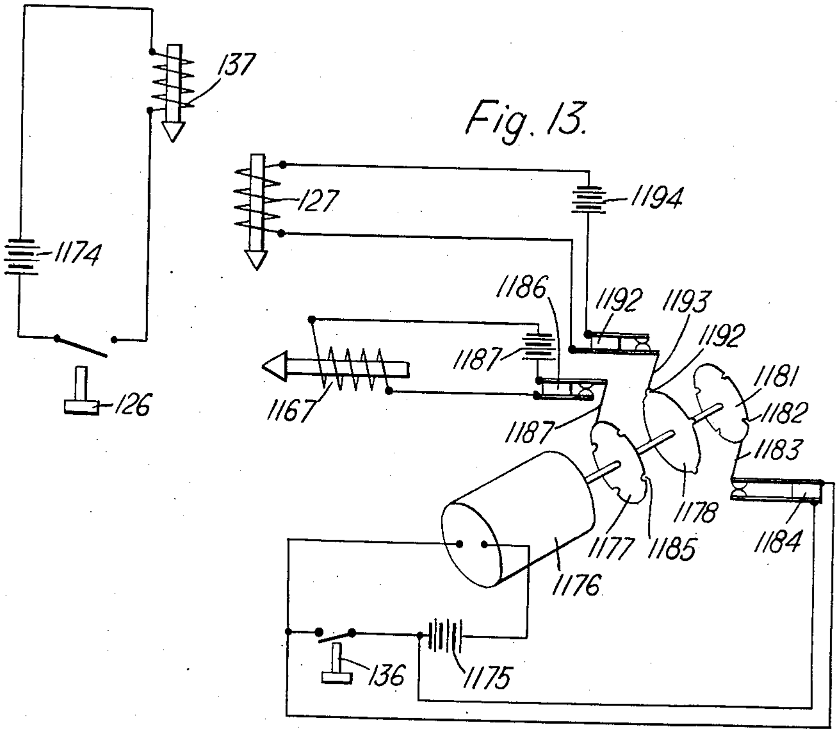
Figure 14:
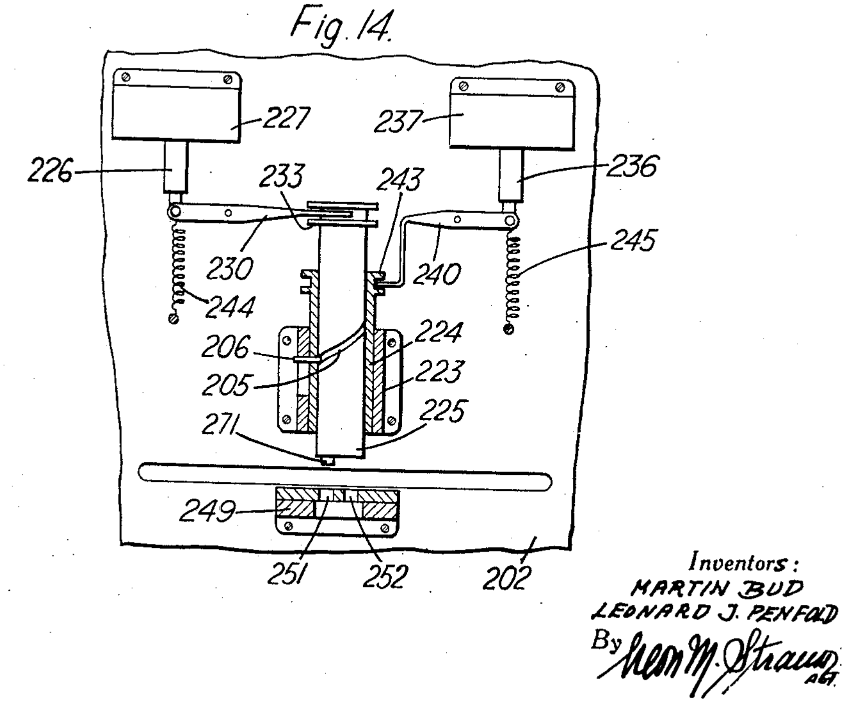

FIGS. 12 and 13 diagrammatically show electrical circuits for actuation of solenoids of the recording clock of FIG. 5; and FIG. 14 shows, partly in section and partly broken away, a third, modified, punch and die arrangement.

The invention consists broadly in a time recording device comprising means for positioning a record card, a punch for punching a hole into the record card, and means for varying the position of the record card and the punch relatively to each other in two different directions in dependence on the time so that the variation in one direction is indicative of units of time and the variation in the other direction is indicative of sub-units of time, a plurality of punches or a displaceable punch being provided, each for punching a hole of different size and/or shape. For example, two punches may be provided, one for punching round holes and the other for punching rectangular holes, one kind of holes indicating commencing times and the other kind indicating finishing times. For example, the record card may have an oblong rectangular shape the two directions being perpendicular to each other, the position of the punch relative to the record card varying in the longitudinal direction of the card to indicate hours and in the transverse direction of the card to indicate minutes, or tenths or twentieths of an hour. Preferably, the variations in the said one direction (in the example, for indicating hours) may be an intermittent variation, the variations taking place at the beginning of each unit of time, the variation in the said other direction (in the example, for indicating minutes, or tenths or twentieths of an hour) being either a continuous variation or an intermittent variation from an initial position to an end position followed by a "fly back" variation from the said end position to the said initial position.

Figure 1:
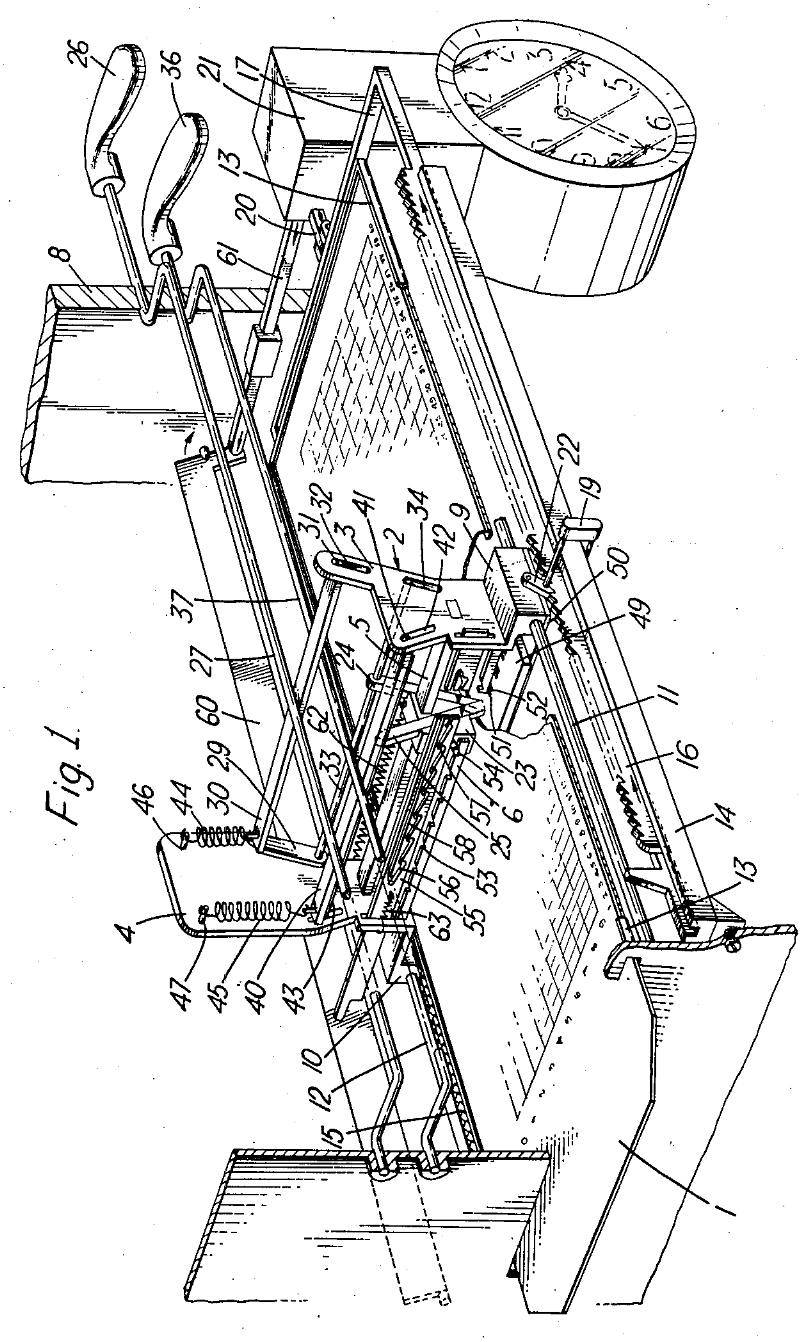
FIG. 1 is a perspective view showing diagrammatically a punching and punch advancing mechanism of a first recording clock, having two punches.
Figure 2:
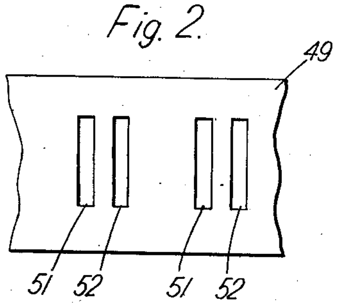
FIG. 2 shows a die block of the mechanism of FIG. 1, partly broken away.

The mechanism shown diagrammatically in FIGS. 1 and 2 is adapted to use cards of standardized dimensions as a recording medium. Such a card is indicated in FIG. 1 by reference numeral 1, and is shown as having ten pre-printed index divisions along its shorter dimension with nine sections between them and sixty pre-printed index divisions along its longer dimension with fifty-nine sections between them, the card thus having nine by fifty-nine or five hundred and thirty-one elemental marking areas defined by the divisions. Although, to facilitate visual inspection and interpretation of the card, it is desirable that the card be in fact pre-printed, this is not essential since, as will be apparent hereinafter, the mechanism is adapted to punch the card at positions thereon corresponding to the elemental marking areas of the card.

In the embodiment of the device of FIGS. 1 and 2, a frame 2 serving as a carriage is provided, having a bar 5 on which a member 23, in the form of a punch block, carrying two punches 24 and 25 is slidably arranged. The punch block 23 is urged by a spring 62 into one end position on the bar 5, a link operable by a clock in the form of a timing device 21 being provided for moving the punch block 23 against the action of its spring 62 every six minutes by one step, so that the punch block 23 moves during each hour from the said one end position into another end position on the bar 5, said clockwork operable link comprising a connecting link 61, a crank plate 60, a ratchet bar 55 and a pin 57. At the end of each hour the pin 57 and the punch block 23 are caused by the spring 62 to snap back and thus to return into the said one end position. The carriage 2 is slidable on a guide in the form of guide rods 11 and 12 in a step-by-step manner perpendicularly to the bar 5 by a pawl and ratchet mechanism operable by the timing device 21 so as to perform one step at the end of each hour, the pawl and ratchet mechanism comprising pawls 22 and two ratchet racks 15 and 16. The punches 24 and 25 are displaceable in the punch block 23, a manually operable striking mechanism having operating cranks 27, 37 being provided for displacing one or the other punch 24 or 25 as required to strike a record card 1 when inserted in a slot of the machine, the position of the record card 1 being defined by two sheath portions 13 joined by a transverse abutting ledge at the end of the sheath portions.

Described in greater detail, the carriage 2 comprises end plates 3 and 4 spaced apart by the rod 5 and a bar 6. The end plates 3 and 4 guide blocks 9 and 10 which are slidable on the guide rods 11 and 12 respectively, the guide rods being fixed to the frame 8 of the mechanism so as to extend parallel to the longitudinal axis of the card 1, the carriage 2 being thereby slidable in the longitudinal direction of the card 1, over substantially the entire length thereof, with the carriage itself extending in bridge-like manner across the card.

The card 1, after insertion into the mechanism, is held in a fixed position relative to the frame of the mechanism by portions of the sheath 13 which borders the card on three of its edges, leaving one end of the card protruding from the mechanism and leaving the faces of the card substantially free. Secured to the frame of the mechanism and positioned so as to extend parallel to the guide rods 11 and 12, two channel members 14 are provided, serving as supports for the two ratchet racks 15 and 16 which are mechanically connected together by a cross bar 17. The ratchet racks 15 and 16 can be reciprocated longitudinally through a distance slightly more than one tooth pitch, by a connecting link 20 operable by the timing device 21, the timing device 21 being arranged to intermittently reciprocate the ratchet racks 15 and 16 by one return stroke per hour. The carriage guide blocks 9 and 10 each carry one of the spring loaded pawls 22 which engage with the ratchet racks 15 and 16, so that on each return reciprocation of the ratchet racks 15 and 16 the carriage 2 progresses along the guide rods 11 and 12 by a distance equal to one tooth pitch of the ratchet racks 15 and 16, this tooth pitch being selected to be equal to the pitch of the index divisions provided on the card in its longitudinal direction. For resetting purposes, the pawls 22 are releasable by a hand knob 19 connected to the pawls.

On the rod 5 of the carriage 2 there is slidably provided the punch block 23 in which the two punches 24 and 25 are slidably mounted. Punch 24 can be operated for punching, by a hand lever 26 attached to the crank 27 which lies in contact with a pressure bar 30, the pressure bar 30 extending between the two end plates 3 and 4 of the carriage 2 and having, at its ends, pins 31 engaging in slots 32 of the end plates 3 and 4. By means of a link 29 the pressure bar 30 is structurally united with a rod 33 passing through a hole at the shank end of the punch 24, the rod 33 extending between the end plates 3 and 4 with its ends in engagement with slots 34 of the end plates 3 and 4. Punch 25 can be operated for punching, by a hand lever 36 attached to the crank 37 which lies in contact with a pressure bar 40, the pressure bar 40 extending between the two end plates 3 and 4 and having, at its ends, pins 41 engaging in slots 42 of the end plates. Parallel to the pressure bar 40, and connected by its ends to the pressure bar, a rod 43 is provided which extends through a hole at the shank end of the punch 25. Tension springs 44 and 45 are provided for normally holding the punches 24 and 25 retracted, spring 44 being operable between the pressure bar 30 and a pin provided on the end plate 4, and spring 45 being operable between the pressure bar 40 and a pin 47 provided on the end plate 4.

A die block 49 carried by a plate 50 secured at its ends to the guide blocks 9 and 10 is provided, the die block 49 having ten pairs of die openings 51 and 52, the pairs being spaced apart at a pitch distance corresponding to the pitch of the index divisions provided on the card in its transverse direction.

The punch block 23, together with punches 24 and 25 can be moved stepwise along the rod 5, the steps being defined by ratchet notches 53 in the bar 6, the punch block 23 having a spring loaded pawl 54 for engaging the ratchet notches 53. The positions for the punch block 23 defined by the notches 53 are such that at each defined position for the punch block 23 the operative section of punch 24 lies in correct relation to one of the die openings 51 and at the same time the operative section of the punch 25 lies in correct relation to a die opening 52 of the same pair of die openings. Stepwise movement of the punch block 23 along the rod 5 is effected by the ratchet bar 55 which has a ratchet track 56 in which the pin 57 provided on the punch block 23 engages. The ratchet track has a return track portion 58 linking its ends, and has a ratchet pitch equal to the pitch of the ratchet notches 53 of the bar 6. The ratchet bar 55 is intermittently reciprocatable through one ratchet pitch by the crank plate 60 operable by the connecting link 61 from the timing device 21 so that the ratchet bar is reciprocated by one return stroke every six minutes. The tension spring 62 extending between the end plate 4 and the punch block 23 serves to positively locate the punch block 23 after each stepping operation, and also serves to return the block 23 to an initial position at the end of every tenth period of six minutes, the return being effected by movement of the pin 57 in the return track portion 58. A tension spring 63 serves to return the ratchet bar 55 after each reciprocation.

The mechanism functions as follows:

Assume, for example, that the carriage 2 is in its position most remote from the timing device 21 with the pawls 22 engaging the first ratchet tooth of the ratchet racks 15 and 16, and that the punch block 23 is in its position most remote from the end plate 3 of the carriage 2, with its pawl 54 engaging the first notch 53 of the bar 6. If a card is placed in the mechanism, the card can be punched, in its first elemental marking area, with an aperture corresponding to the profile of punch 24 or punch 25 by actuation of hand lever 26 or 36 respectively. The punch block 23 remains in this position for six minutes, after which the timing device 21, acting through the connecting link 61, and the crank plate 60, causes the ratchet bar 55 to reciprocate through one stroke whereby to move the punch block 23 into its next defined position along the rod 5 with its pawl 54 engaging the second notch 53 of the bar 6.

The punch block 23 is advanced in this manner by one step every six minutes until at the end of one hour the punch block 23 is returned to its first position by the spring 62 as already described. At the same time as the return movement of the punch block 23, the carriage 2 is moved one step along the ratchet racks 15 and 16. Actuated by the timing device 21, the punch block 23 and the carriage 2 perform their stepping movements until all elemental marking areas of the card 1 have been traversed by the punches 24 and 25, after which the carriage can be reset, by means of the hand knob 19, to its initial position.

Apertures punched in the card 1 by punch 24 serve for indicating the beginning of a timed period, and apertures punched by punch 25 serve for indicating the end of a timed period. Punch 24 with its dies 51 and punch 25 with its dies 52, operate on different sub-areas within the elemental marking areas, so that subsequently, by observing which sub-area within an elemental marking area has an aperture, it is possible to determine whether the punching in any punched elemental marking area is indicative of the beginning or the end of a timed period.

The clock can be used as an employees' attendance record clock, in which case each employee has a card for inserting into the mechanism and punching, the hand lever 26 being pressed for punching the card to indicate arrival and the hand lever 36 being pressed for punching the card to indicate departure.

Figure 3:
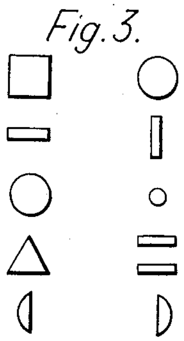
FIG. 3 shows a series of pairs of punch profiles.

In the mechanism of FIGS. 1 and 2, the profiles of both punches and the corresponding die openings are rectangular, so that even though the punches operate in different sub-areas of the elemental marking areas of the card, it is possible for confusion to arise in assessment of the card apertures. To overcome or reduce this possibility, the two punches can be given profiles of different shapes, a number of possible combinations being shown in FIG. 3.

Since the area or shape of the aperture produced by one punch is different from that produced by the other punch, it is possible for punched cards to be subsequently evaluated by evaluating means comprising for example photo-electric sensing members.

The card shown in FIG. 4 has apertures indicating two timed periods, the first timed period beginning three hours after the mechanism was placed in operation and ending twelve minutes later, the second timed period beginning thirty-six minutes after the end of the first timing period, and lasting thirty minutes, the discriminatory accuracy of the mechanism being six minutes.

The mechanism shown in FIGS. 1 and 2 and described above, is primarily given by way of explanation and a more detailed embodiment of a time record clock will now be described.

The clock is shown in FIG. 5, and operates on a record card 101. The clock has a casing 103 with a slot 104 at the front of the casing for receiving the card, and, at the side of the casing, a slot 105 through which a resetting hand knob 119 extends, the slot 105 having a scale calibrated from 0 to 59 hours for co-operation with an index mark provided on the hand knob 119. At the front of the clock there is provided a clock dial 127, a finger operable button 126 for actuating punching of the card 101 with an aperture indicating the beginning of a timed period, and a finger operable button 136 for actuating punching of the card 101 with an aperture indicating the end of a timed period.

Figure 6:
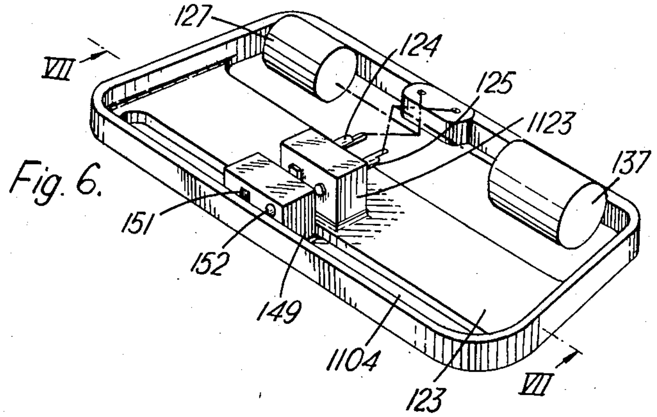
FIG. 6 is a perspective view showing diagrammatically a movable carrier and a punch and die arrangement mounted thereon of the second clock.
Figure 7:
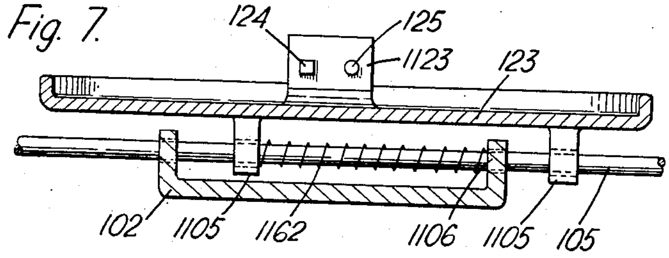
FIG. 7 is a sectional view along the line VII—VII of FIG. 6.
Figure 8:
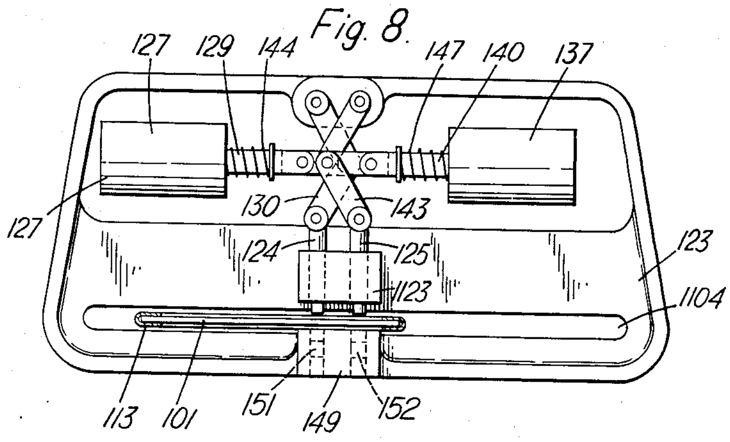
FIG. 8 is a view showing, in greater detail, the movable carrier and punch operating mechanism shown in FIG. 6.

The clock mechanism comprises a traverse frame 102 (FIGS. 7 and 11) carrying two parallel guide rods 105 on which a punch carriage 123 is slidably mounted by means of lugs 1105 provided on the punch carriage. The punch carriage has a punch block 1123 and a die block 149 (FIGS. 6 and 8) fixed thereto in aligned relationship, the punch block carrying two punches 124 and 125 and the die block having two die openings 151 and 152. Punch 124 can be actuated for punching, by a solenoid 127 having a movable core 129 operating through a toggle linkage 130, the core 129 of the solenoid 127 being loaded by a compression spring 144 so that when the solenoid 127 is not energised, the punch 124 is in its retracted position as shown in FIG. 8. Punch 125 can be actuated in a manner similar to punch 124, by a solenoid 137 having a movable core 140 loaded by a spring 147 and operating through a toggle linkage 143.

Figure 9:
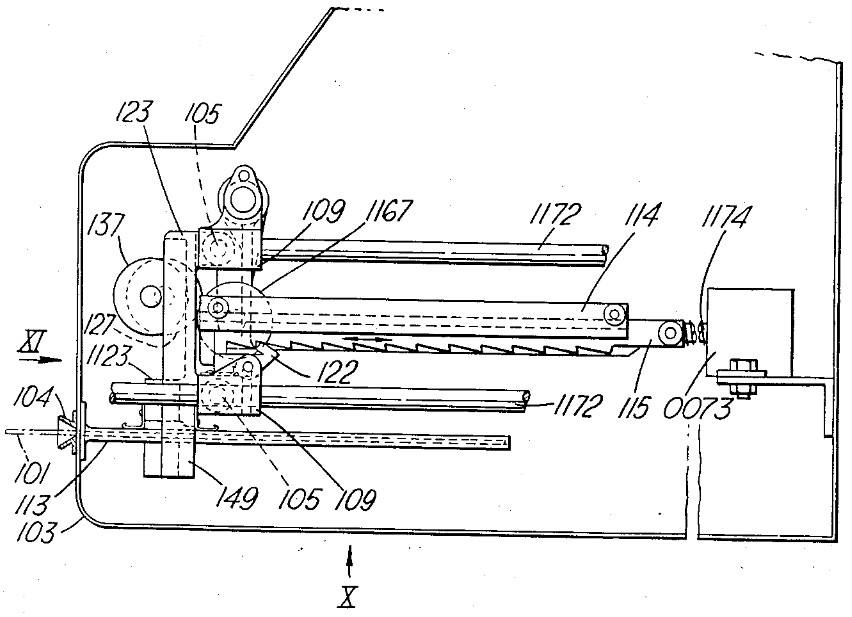
FIG. 9 is a view of the recording clock of FIG. 5, partly in section and partly broken away, in the direction of the arrow IX of FIG. 5.
Figure 10:
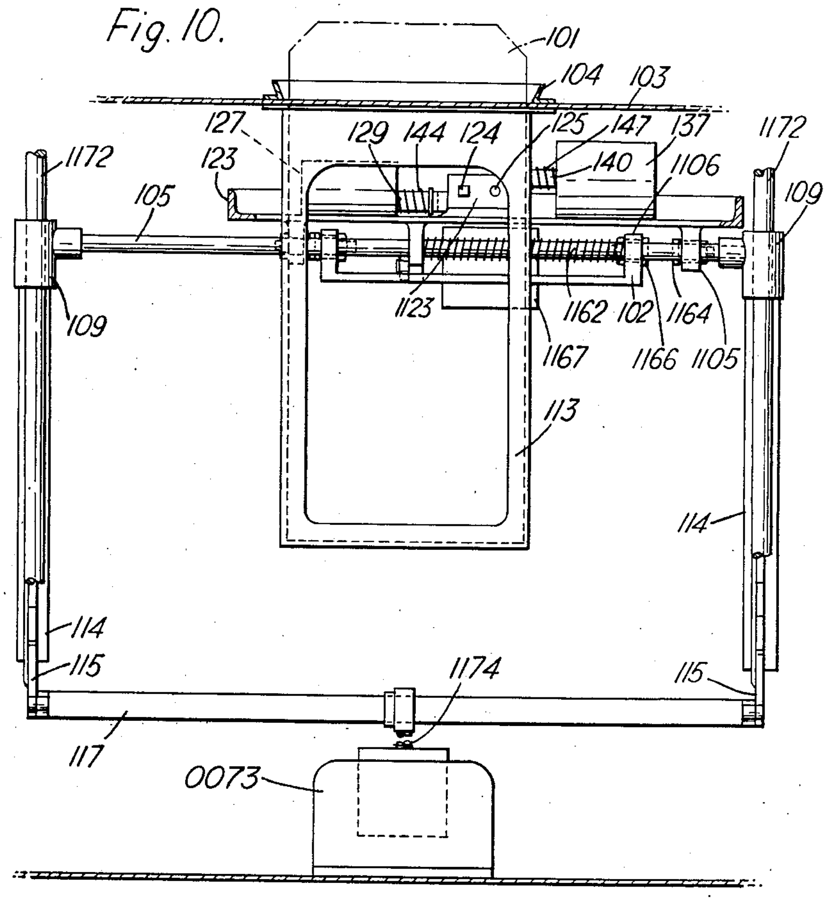
FIG. 10 is a view, partly in section and partly broken away, in the direction of the arrow X of FIG. 9.
Figure 11:
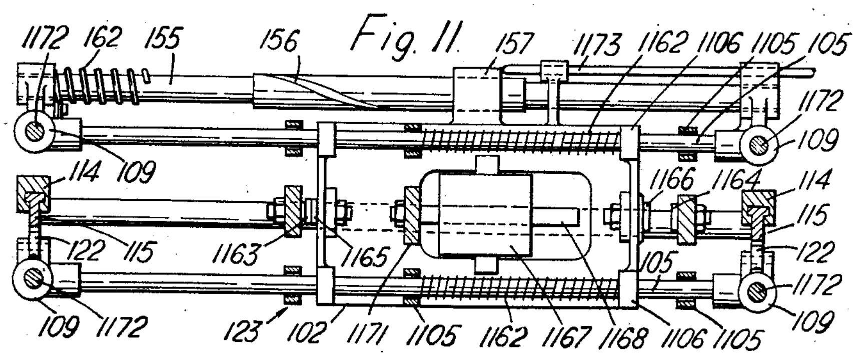
FIG. 11 is a view, partly in section and partly broken away, in the direction of the arrow XI of FIG. 9.

The casing 103 (FIGS. 5, 9 and 10) of the clock carries a sheath 113 (FIGS. 8, 9 and 10) which receives the card 101 in such manner that the card is oriented with respect to the punch carrier 123 as shown in FIGS. 9 and 10, the sheath 113 passing through a slot 1104 (FIGS. 6 and 8) in the punch carrier. As shown in FIGS. 10 and 11, the punch carrier however, is slidable on the rods 105 in a plane parallel to the transverse dimension of the card 101 so that the precise position of the punches 124 and 125 relative to the transverse dimension of the card 101 depends on the position of the punch carrier 123 relative to the rods 105, the slot 1104 in the punch carrier being long enough to allow the punches 124 and 125 to be movable, with the punch carrier, over the whole active breadth of the card. Normally the relative position between the punch carrier 123 and the traverse frame 102 is as shown in FIG. 7, compression springs 1162 acting between lugs 1105 of the punch carrier and lugs 1106 of the traverse frame 102 serving to hold the punch carrier in this position. The punch carrier 123 can however be moved against the action of the springs 1162 and relative to the traverse frame 102 by a distance equal to the spacing between the punches 124 and 125, abutment screws 1163 and 1164 of the punch carrier and corresponding abutment screws 1165 and 1166 (see FIG. 11) of the traverse frame limiting the displacement of the punch carrier and traverse frame being shown in FIGS. 10 and 11 as in the displaced condition, displacement being effected by a solenoid 1167 secured to the traverse frame and acting on a plunger 1168 secured to a lug 1171 of the punch carrier.

The rods 105 on which the traverse frame is slidable, terminate at their ends in bushing units 109 slidably provided on four guide rods 1172 arranged parallel to each other and perpendicular to the general plane of the punch carrier 123, so that in addition to the traverse frame being slidable on rods 105, the entire assembly comprising traverse frame, punch carrier and rods 105 is slidable in a direction perpendicular to the plane of the punch carrier.

Sliding movement of the traverse frame in a direction perpendicular to its plane is effected by ratchet bars 115 (FIGS. 9, 10 and 11) which are slidable in guides 114 and which can be intermittently reciprocated through one return stroke by a solenoid 0073 having a plunger 1174 attached to a cross bar 117 joining the two ratchet bars 115. Two of the bushing units 109 carry ratchet pawls 122 for co-operation with the ratchet bars 115, these pawls 122 being releasable by the hand knob 119 shown in FIG. 5. The other two bushing units 109 carry bearings for a rotatable worm shaft 155 (see FIG. 11) having a worm 156 which passes through a follower block 157 provided on the traverse frame 102. A helical spring 162 is provided on the worm shaft 155, the spring being fixed to the shaft by one of its ends, and fixed by its other end to the adjacent bushing unit 109. The worm shaft is rotatable in intermittent steps by an electromagnetically operated drive mechanism (not shown in the drawings but known *per se*) so that the traverse frame can be intermittently stepped along the rods 105. A feeler rod 1173 (FIG. 11) is provided for disengaging the said clutch mechanism at the end of travel of the worm 156 so that on disengagement of the clutch mechanism the worm shaft 155 and the traverse frame 102 can be moved into their initial positions by the unwinding action of the spring 162.

The manually operable button 126 (FIG. 5) is connected in an electric circuit, illustrated in FIG. 12. Contacts of the button 126 are connected in series with the solenoid 137 and a source of electrical energy 1174, so that when the button 126 is pressed the solenoid 137 is actuated.

The manually operable button 136 is connected in an electric circuit, illustrated in FIG. 13. Contacts of the button 136 are connected in series with a source of electrical energy 1175 and a slow speed motor 1176 carrying three cam discs 1177, 1178 and 1181, so that when the button 136 is pressed, the motor 1176 begins to rotate the cam discs. The cam disc 1181 has four equally spaced notches 1182 so arranged that in the rest position of the motor, one of the notches lies opposite a feeler 1183, a switch 1184 operable by the feeler being then open circuited. On rotation of the motor, initiated by the button 136, notch 1182 no longer lies opposite the feeler 1183 so that the switch 1184 closes. The switch 1184 is connected in parallel with the contacts of button 136, and as soon as the motor has begun rotation, the button 136 can be released without stopping the motor. The cam disc 1177 has four equally spaced notches 1185 and operates a switch 1186 by a feeler 1187 which contacts the cam disc. The notches 1185 are aligned with the notches 1182 of the cam disc 1181, so that in the rest position of the motor the switch 1186 is open circuited, the circuit being closed only after the motor begins to rotate. Switch 1186 is connected in series with a source of electrical energy 1187 and the solenoid 1167 which causes the displacement of the punch carrier 123 relative to the traverse frame 102 (FIG. 11). Cam disc 1178 carries four equally spaced protrusions 1191, arranged out of alignment with the notches 1182 and 1185 of the cam discs 1181 and 1177. A switch 1192 operable by a feeler 1193 contacting the surface of the cam disc 1178 is provided, the switch being connected in series with a source of electrical energy 1194 and the punch operating solenoid 127. The switch 1192 is operated only when a protrusion 1191 of the cam disc 1178 is in engagement with its feeler 1193, and since the protrusions 1191 of the cam disc 1178 lag the notches of the cam disc 1177, the solenoid 127 is not energised until the solenoid 1167 is energised, and is de-energised before the solenoid 1167 is de-energised. After a protrusion 1191 of the cam disc 1178 has passed the feeler 1193, the motor 1176 continues to rotate until a notch 1182 of the cam disc 1181 lies opposite the feeler 1183 of the switch 1184, at which point the contacts of button 136 are no longer short circuited by the switch 1184 and the motor 1176 is no longer energised. The time lag thus provided between energisation of the solenoid 1167 and the solenoid 127, ensures that any displacement of the punch carrier 123 relative to the traverse frame 102 is effected before the punch 124 is operated.

Figure 4:
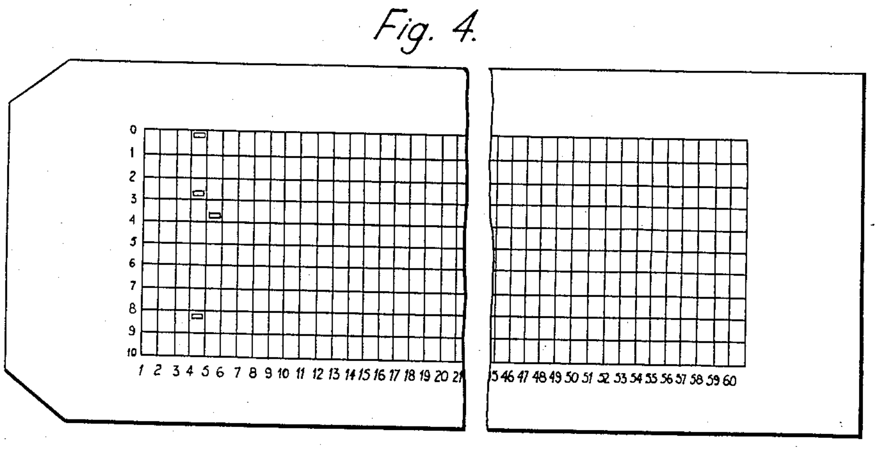
FIG. 4 shows a record card.

The card 101 for use with the mechanism differs from the card shown in FIG. 4, in that it is divided into one thousand two hundred elemental marking areas, there being twenty divisions, each corresponding to three minutes, along the shorter dimension of the card and sixty divisions along the longer dimension of the card. The worm shaft 155 (FIG. 11) is rotatable, in twenty intermittent steps, through a total of one complete revolution per hour each step corresponding to three minutes, so that after each three minute period, the punch carrier 123 together with the traverse frame 102 are moved by one step along the rods 105. At the end of each hour the feeler rod 1173 causes the worm shaft 155 to be released, whereupon the helical spring 162 causes the traverse frame 102, with the punch carrier 123 to be returned to their initial positions. Also at the end of each hour, the solenoid 0073 (FIGS. 9 and 10) is actuated to cause the entire assembly of traverse frame 102 punch carrier 123, guide rods 105 and worm shaft 155, to be moved along the guide rods 1172 through a distance corresponding to the pitch distance of the ratchet teeth of the ratchet bars 115. The punch block 1123 thus moves over the effective area of the card 101 in two directions, in a manner similar to that described with respect to FIG. 1.

The arrangement is such that it is punch 125 which, in relation to the card 101, is in correct time sequence with the elemental marking areas of the card. This punch is used for indicating the beginning of a timed operation, and is shown in the figures as having a round profile. When it is desired to punch a card 101 to indicate the end of a timed period, it is necessary for the punch 124 to be moved first into the position, relative to the card, which was occupied by punch 125. This movement is effected by solenoid 1167 as described hereinbefore. Punch 124 is shown as having a square profile, but it should be understood that any two dissimilar profiles, such as those illustrated in FIG. 3, can be used for the punches 124 and 125.

When the punch 125 has reached the last elemental marking area of the card 101, the entire assembly slidable on the guide rods 1172 can be returned to its initial position, or any desired intermediate position, by the hand knob 119 (FIG. 5) which is linked to the ratchet pawls 122 (FIG. 12).

In a further embodiment of the mechanism, as shown in FIG. 14, the traverse frame itself serves as the punch carrier, this frame being indicated by reference numeral 202. The traverse frame 202 carries a punch block 223 in which a punch sleeve 224 is slidably mounted. The punch sleeve 224 has a cylindrical bore in which a punch 225 is provided. The punch 225 has a helical groove 205 extending over half of its circumference, a pin 206 fixed to the punch sleeve 224 extending into the groove. A die block 249 fixed to the traverse frame 202 is provided, both the punch 225 and the punch sleeve 224 being movable towards and away from the die block 249 by operating levers 230 and 240 respectively which are respectively acted upon by plungers 226 and 236 of solenoids 227 and 237, the operating lever 230 engaging a flange 233 of the punch 225, and the operating lever 240 engaging a flange 243 of the punch sleeve 242. The operating lever 240 and the punch sleeve 224 are normally held in the position shown in FIG. 14 by a tension spring 245 extending between the lever 240 and the traverse frame 202. The operating lever 230 and the punch 225 are normally held in the FIG. 14 position by a tension spring 244 extending between the lever 230 and the traverse frame 202.

The punch 225 has a punching projection 271 which, when the punch is in the position shown in FIG. 14, is aligned with a die aperture 251 of the die block 249. If the punch sleeve 224 is moved towards the die block 249, by energization of the solenoid 237, the punch sleeve carries the punch 225 with it against the action of the springs 244 and 245 by virtue of the engagement of the pin 206 of the punch sleeve 224 in the end of the groove 205 of the punch 225, to effect punching of a card when arranged between the punch block 223 and the die block 249. If, however, the solenoid 227 is energized instead of solenoid 237, the punch is acted upon by the operating lever 230, and is moved towards the die block 249 against the action of the spring 244. The punch sleeve 224 is held by the spring 245, and the punch is thus not able to carry the punch sleeve with it, and the punch, by the engagement of the pin 206 with the groove 205, is thereupon constrained to twist through 180° while moving towards the die block 249. The die block 249 has a second die opening 252, adjacent the die opening 251, opening 252 having the same form as opening 251, but being reversed so as to match the punch projection 271 when the punch is in its twisted position. Thus by means of a single punch it is possible for two different punchings to be effected. Solenoid 227 corresponds to solenoid 127 of the embodiment shown in FIG. 8 and solenoid 237 corresponds to solenoid 137.

The remainder of the apparatus is similar to that described with reference to FIGS. 6 to 13 with the exception that no mechanism is provided for laterally displacing the punch block, except in sequence with time, this being not necessary due to the use of a single punch.

While three embodiments of the invention have been shown and described, it will be understood that various other omissions, additions and modifications in the form and details of the apparatus illustrated and in their operation may be made by those skilled in the art without departing from the spirit of the invention. For example, in respect of the embodiment described with reference to FIGS. 6 to 13, the punches 124 and 125 may be provided on an oscillatable turret.

We claim:

1. In and for a time recording device for providing markings on a record sheet the positions of which markings relative to the record sheet are indicative of times at which the device has been operated: the combination of a marking means having an operative head, means mounting said marking means rectilinearly displaceably along and rotatably about an axis, said operative head having a profile which is unsymmetric relative to said axis, a first means for operating said marking means by imparting a rectilinear displacement thereto, a second means for operating said marking means by imparting a rotational motion and a rectilinear displacement thereto, and further means co-operative with said mounting means and said second operating means for causing said rotational motion of said marking means when said second operating means is actuated, said first and second operating means being actuatable independently of each other whereby alternatively to provide the markings differently on the record sheet depending on whether said first or said second operating means has been actuated.

2. In and for a time recording device for providing punch holes on a record sheet the position of which holes relative to the record sheet are indicative of times at which the device has been operated, the combination of a punch, a punch head on said punch, a sleeve in which said punch is mounted rectilinearly displaceably along and rotatably about the axis common to said punch and said sleeve, said punch head having a profile which is unsymmetric relative to said axis, a first means for operating said punch by rectilinearly displacing it, and a second means for operating said punch by rotating and rectilinearly displacing it, the said first and second operating means being actuatable independently of each other, whereby alternatively to punch holes differently on the record sheet depending on whether said first or second operating means has been actuated and thereby the punch head has been displaced or rotated and displaced, said second operating means comprising an operating lever, a flange on said punch engaged by said lever, means for resiliently holding the sleeve in an initial position, a pin engaging a helical groove to form a pin and groove connection, one element of the pin and groove connection being in fixed position relative to the sleeve and the other relative to the punch, whereby when the lever is operated the pin slides in the helical groove while the sleeve is resiliently held in the initial position and causes the punch to rotate whereupon on termination of the movement of the pin in the groove the lever on its continued actuation displaces the punch and the sleeve bodily and rectilinearly against the action of the resilient holding means.

3. A time recording device as claimed in claim 2, wherein the first operating means comprises an operating lever, a flange on the sleeve engaged by said lever for displacing the sleeve and the punch bodily and rectilinearly when the lever is actuated.

4. A time recording device as claimed in claim 2, and comprising a die block having two die apertures, one arranged for co-operation with the punch head when the punch has been displaced and the other arranged for co-operation with the punch head when the punch has been rotated and displaced.

References Cited in the file of this patent

UNITED STATES PATENTS

| | | |
|---|---|---|
| 797,491 | Burk | Aug. 15, 1905 |
| 864,500 | Abbott et al. | Aug. 27, 1907 |
| 1,010,576 | Blair | Dec. 5, 1911 |
| 1,219,912 | Bryce | Mar. 20, 1917 |
| 1,832,918 | Swick | Nov. 24, 1931 |
| 2,080,065 | Ross et al. | May 11, 1937 |
| 2,156,945 | Huth et al. | May 2, 1939 |
| 2,551,933 | Findlay | May 8, 1951 |

FOREIGN PATENTS

| | | |
|---|---|---|
| 386,569 | France | Apr. 14, 1908 |
| 596,852 | Germany | May 15, 1934 |